UNITED STATES PATENT OFFICE.

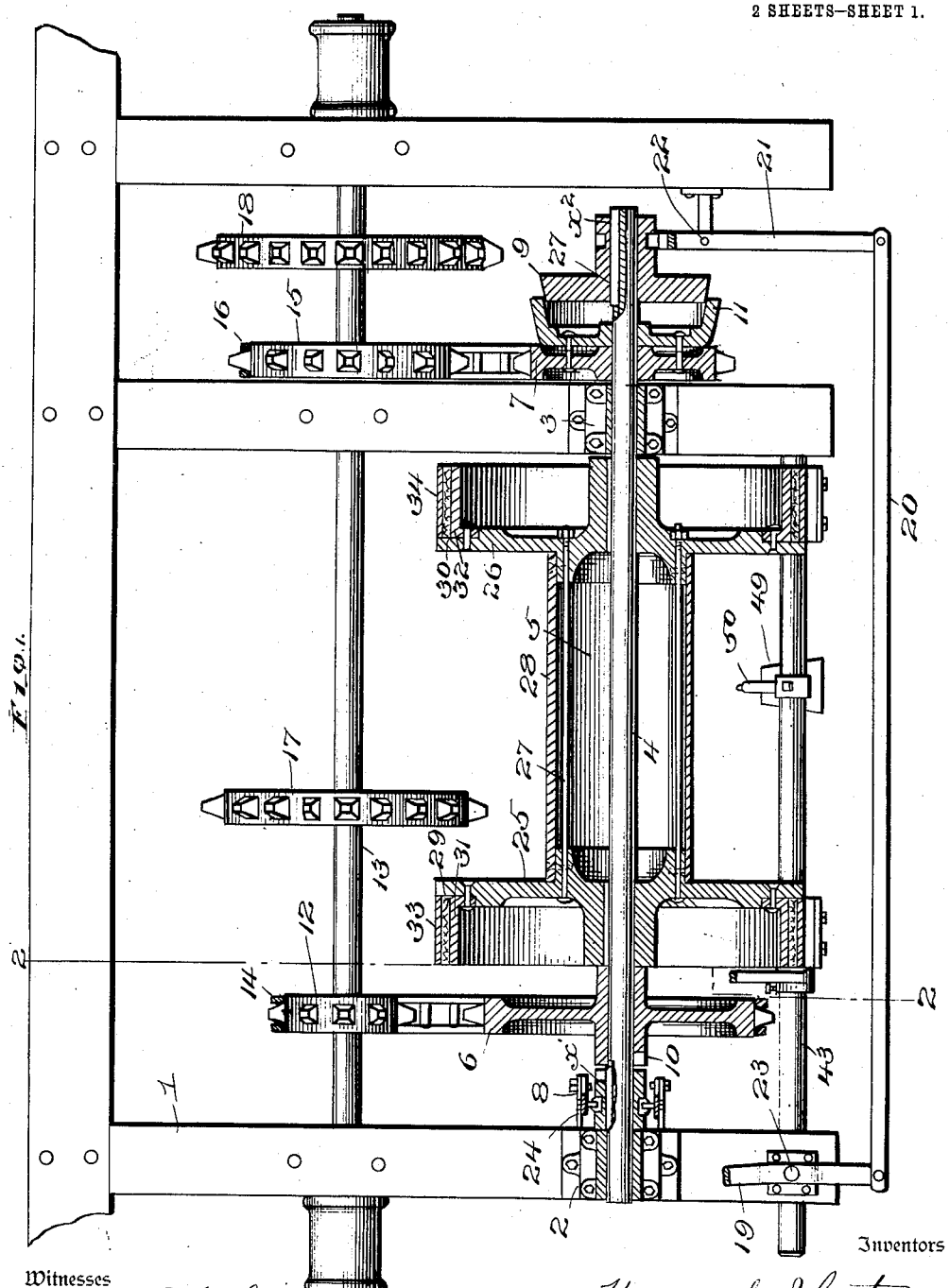

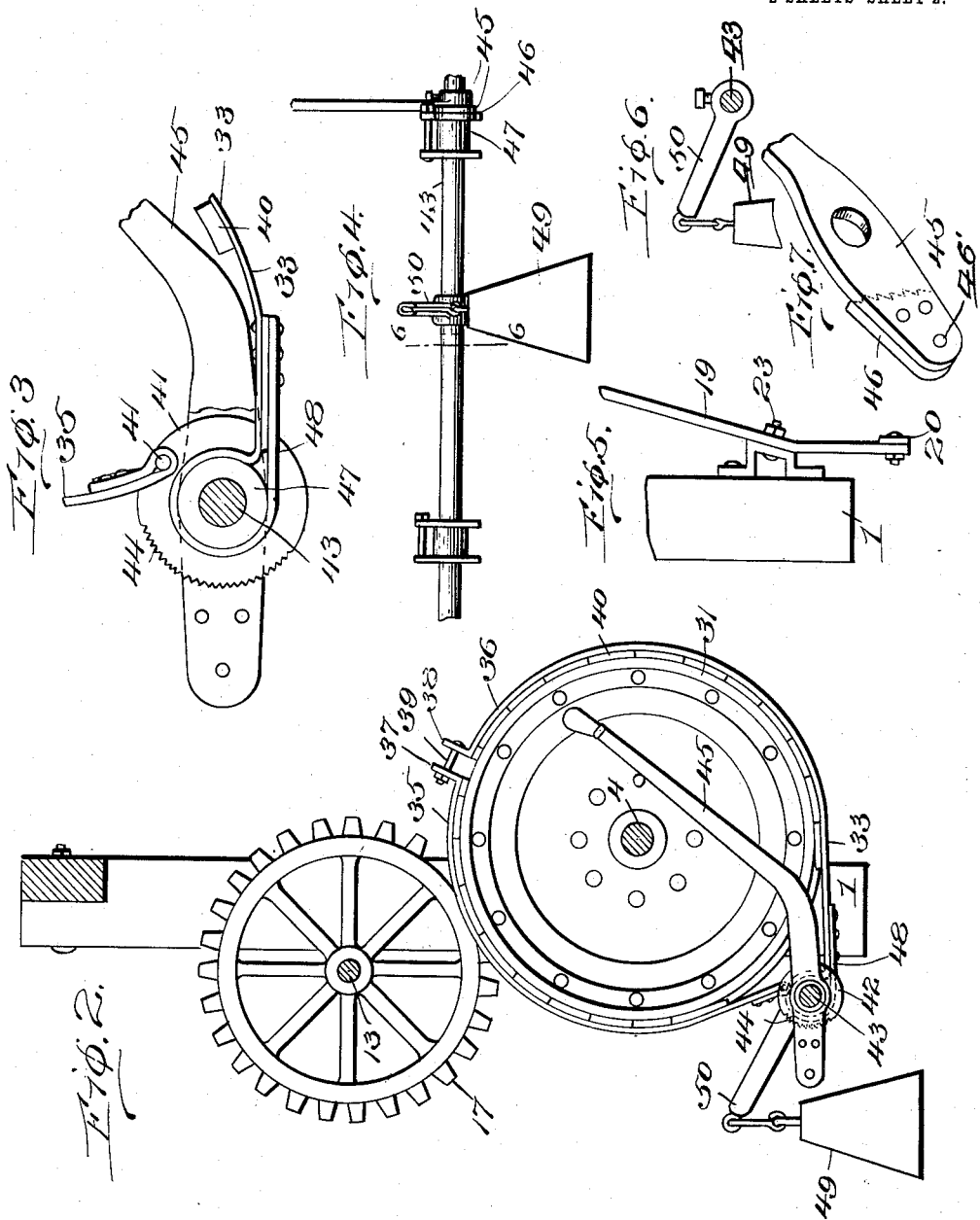

HORACE G. JOHNSTON, OF CORSICANA, TEXAS, ASSIGNOR TO AMERICAN WELL & PROSPECTING COMPANY, INC., OF CORSICANA, TEXAS, A CORPORATION OF TEXAS.

HOISTING-MACHINE.

1,027,253.          Specification of Letters Patent.       Patented May 21, 1912.

Application filed January 23, 1911. Serial No. 604,169.

*To all whom it may concern:*

Be it known that I, HORACE G. JOHNSTON, a citizen of the United States, residing at Corsicana, in the county of Navarra and State of Texas, have invented certain new and useful Improvements in Hoisting-Machines; and I do hereby declare the following to be a full, clear, and exact description of the invention, such as will enable others skilled in the art to which it appertains to make and use the same.

This invention relates to improvements in hoisting machines, and particularly to the construction and arrangement of drums and controlling devices for the brakes thereof.

The object in view is the arrangement of improved means for causing the brakes of hoisting drums to grip the drum.

A further object of the invention is the arrangement of improved means for adjusting the action of the brakes of a hoisting drum in order to take up the wear of the machine.

With these and other objects in view the invention comprises certain novel constructions, combinations, and arrangement of parts as will be hereinafter more fully described and claimed.

In the accompanying drawings: Figure 1 is a longitudinal vertical section through an embodiment of the invention. Fig. 2 is a section through Fig. 1 on line 2—2. Fig. 3 is a detail fragmentary view of the controlling lever and associated structures. Fig. 4 is a fragmentary rear view of the controlling lever, counter-balancing weight, and associated parts, the same being shown on a reduced scale to that shown in Fig. 3. Fig. 5 is an edge view of the clutch shifting lever. Fig. 6 is a fragmentary sectional view on line 6—6 of Fig. 4. Fig. 7 is a detail fragmentary perspective view of one end of the controlling lever.

In forming a device embodying the invention a drum is provided formed with braking flanges, preferably at each end. Arranged on these braking flanges are flexible brake bands which are connected to suitable fulcrum spools. These fulcrum spools are in turn connected to a shaft so that both spools will act together upon the operation of a single lever associated with one of the spools. This spool is provided with ratchet teeth on part of its periphery which co-act with a toothed lug on the lever for causing power to be transmitted from the lever to the fulcrum, and also for permitting the lever to be adjusted in respect to the fulcrum in order to compensate for the wear on the brake band and the brake shoe.

In order that the invention may be more clearly understood an embodiment of the same is shown in the accompanying drawings, in which—

1 indicates a framework of any desired kind braced in any desired manner for supporting the various operating and moving parts of the drum and associated structures. Arranged on framework 1 are bearings 2 and 3 which support a drum shaft 4. On shaft 4 is mounted a drum 5, sprocket wheels 6 and 7, and sliding clutch members 8 and 9. The clutch members 8 and 9 engage clutch structures 10 and 11 rigidly secured to sprocket wheels 6 and 7 respectively. The clutch composed of members 9 and 11 is of the cone-type, while the clutch structure associated with wheel 6 is of a different type. It will be evident that both clutches may be of the cone-type if desired. The clutches are arranged so that when one is thrown out of engagement the other clutch will be thrown into engagement, but may be adjusted so that the drum may rotate freely if desired, but an extreme movement of the clutches will either throw the same positively into operation or entirely out of operation. The clutch members 8 and 9 are slidingly mounted or splined to shaft 4, while the sprocket wheels 6 and 7 are loosely mounted on the shaft so as to freely rotate thereon, unless connected to the shaft through the respective sprockets. The drum 5 is also secured to the shaft 4, preferably by being keyed thereto so as to be positively rotated whenever shaft 4 is rotated. Sprocket wheel 6 is considerably larger than sprocket wheel 12 mounted on power shaft 13, so that sprocket wheel 12 will rotate several times while sprocket wheel 6 is rotating once, a suitable chain 14 being provided for communicating power from one sprocket wheel to the other. The sprocket wheels 7 and 15 are preferably of the same size, so that when the clutch formed of members 9 and 11 is in operation the drum will rotate at the same speed as the power shaft 13 as sprocket 15 is rigidly secured to shaft 13 and is connected with sprocket wheel 7 by a suitable chain 16. The shaft 13 may receive power from any suitable source, not shown, the power being transmitted to sprocket wheels 17 and 18, and from thence to shaft 13 to which the sprocket wheels are secured. When it is desired to disengage the clutch portion 8 and engage clutch portion 9 the clutch controlling lever 19 is moved in one direction which will cause movement to be transmitted through connecting rod 20 to lever 21 which is pivotally mounted at 22 on a suitable bracket. Lever 21 is connected with the clutch member or portion 9 so that the clutch is easily thrown into and out of operation by a suitable movement of lever 19 which is pivoted at 23 to a suitable support secured to framework 1.

Drum 5 is formed with end members 25 and 26 which are formed with hubs and which are rigidly keyed to shaft 4. A plurality of retaining bolts 27 are provided for holding the end members 25 and 26 from separating, while a central drum or tubular portion 28 is provided for holding the end members spaced apart, and for acting as the center or core of the drum 5. The end members 25 and 26 are formed with annular notched out portions 29 and 30 for receiving the annular friction flanges 31 and 32 which are bolted or riveted to the end members in such a manner as to be easily removed whenever new ones are desired. The notches 29 and 30 are made of sufficient depth, and the friction flanges 31 and 32 are made sufficiently small for permitting the end members 25 and 26 to project above flanges 31 and 32 which will assist in holding the friction bands 33 and 34 in position. The friction bands are made of identical structure so that the description of one will apply to the other. In Fig. 2 it will be seen that the friction band 33 is formed in two parts, namely parts 35 and 36, which have turned-up portions 37 and 38 connected by a tension bolt 39 for properly adjusting the parts of the friction band to the friction flange 31. Friction flange 31 is preferably made from open hearth steel castings, while the members 35 and 36 are made of flexible metal having secured thereto blocks of wood 40 which engage the friction flange 31, and which may be easily renewed from time to time without renewing the metallic parts 35 and 36. The end of part 35 opposite extension 37 is bent around a pin 41 (Fig. 3) rigidly secured to a fulcrum spool 42 which in turn is rigidly secured to shaft 43. Shaft 43 extends sufficiently far across the framework 1 to be journaled in some of the uprights thereof, and to permit the connection of the bar with both of the friction bands or brakes 33 and 34. It will be understood that a fulcrum spool 42 is provided for each of the brake bands 33 and 34, though the fulcrum spool 42 at brake band 34 need not have the notches or teeth 44 unless it is desired to apply a controlling arm at that end. Preferably a brake band controlling lever 45 is pivotally mounted on shaft 43 so as to have the notched lug or extension 46 secured thereto to engage the notches 44 of the fulcrum spool 42 positioned in proximity to the friction band 33. Extension 46 is provided so that whenever the friction members or shoes 40 become worn and it is not desired to tighten up tension bolt 39, member 46 may be removed by taking out the securing members 46' and lever 45 raised to the position shown in Fig. 2, while the parts 35 and 36 are held tight manually, and then the extension 46 replaced. This will accommodate any ordinary wear, and in fact permit the use of the members 40 until the same have practically been worn out. The fulcrum spool 42 is provided with a hub structure 47 around which a band 48 is passed and to which is bolted or riveted the part 36 of brake band 33.

When it is desired to cause the brake bands 33 and 34 to engage the flanges 31 and 32 lever 45 is depressed which will twist or turn partially shaft 43, and also will turn partially the fulcrum spools 42 which will pull upon the ends of the brake bands and cause the same to frictionally engage the flanges 31 and 32. When the lever 45 is released ordinarily the brake bands will automatically release themselves, but if for any reason they should stick the same are positively released by the action of weight 49 which is pivotally mounted upon a lever 50 which lever is rigidly secured by any desired means to shaft 43. It will, of course, be evident that weight 49 may be made of any desired size and weight, so as to operate properly but not require any considerable power for lifting the same when the lever 45 is depressed, the same being preferably arranged in such a way as to slightly more than counter-balance the lever 45 and associated parts for bringing the same back to their normal released position, but not substantially resisting any movement of the lever 45.

What I claim is:

1. In a hoisting mechanism, a rotating hoisting drum, means to rotate the drum, brake bands encircling the drum in two places, a shaft journaled adjacent the periphery of the drum, means carried by said shaft for tightening the brake bands upon said drum, a disk carried by the shaft provided with ratchet teeth at its periphery, a lever having its fulcrum upon the shaft, and a block removably and rigidly secured to the lever having ratchet teeth in rigid engagement with the ratchet teeth of the disk and capable of adjustment by removing the plate from the lever and replacing it.

2. In a braking mechanism, a driving shaft, brake drums arranged thereon, a shaft spaced therefrom, fulcrum spools carried by said spaced shaft, brake bands carried by said spools and adapted to pass about said brake drums, one of the flanges of one of said spools having a serrated edge, a lever carried by said spaced shaft, and a serrated lug removably carried on said lever and adapted to engage the serrated edge of said spool.

In testimony whereof I affix my signature in presence of two witnesses.

HORACE G. JOHNSTON.

Witnesses:
W. J. HALL,
M. WESTMORELAND.